United States Patent [19]

Taniguthi et al.

[11] Patent Number: 4,463,777

[45] Date of Patent: Aug. 7, 1984

[54] OUTSIDE SCREW-AND-YOKE TYPE VALVE

[75] Inventors: Tatsuhito Taniguthi; Yutaka Niwa; Takashi Masumoto, all of Mie, Japan

[73] Assignee: Hitachi Metals, Ltd., Japan

[21] Appl. No.: 273,302

[22] Filed: Jun. 15, 1981

[30] Foreign Application Priority Data

Jun. 26, 1980 [JP] Japan ................................. 55-86819

[51] Int. Cl.³ .............................................. F16K 37/00
[52] U.S. Cl. .................................. 137/553; 137/797; 251/327; 251/329; 251/267
[58] Field of Search ............... 251/225, 215, 216, 318, 251/319, 327, 266, 267, 268, 269, 329; 137/797, 551, 553, 559

[56] References Cited

U.S. PATENT DOCUMENTS

| 940,239 | 11/1909 | Dikkers | 251/318 |
| 2,249,848 | 7/1941 | O'Brien | 137/797 |
| 2,732,855 | 1/1956 | Hobbs | 251/225 |
| 2,843,152 | 7/1958 | Laird et al. | 137/797 |
| 2,905,192 | 9/1959 | Velon | 251/267 |
| 3,701,362 | 10/1972 | Reese | 137/797 |
| 3,768,774 | 10/1973 | Baugh | 251/327 |

Primary Examiner—A. Michael Chambers
Attorney, Agent, or Firm—Finnegan, Henderson, Farabow, Garrett & Dunner

[57] ABSTRACT

One or more grooves are provided to weaken a portion of the stem nut, retaining nut, or yoke bush in a disk/gate valve to provide selective breakage to limit axially directed forces transmittable through the stem and stem connection. Clearances between the valve body and the non-weakened nut or bush portion to permit axial movement of the latter relative to the former following breakage to provide visual indication of breakage.

9 Claims, 14 Drawing Figures

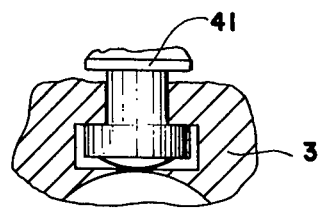
Fig. 1-a
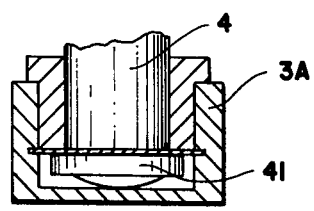
Fig. 9-a

OUTSIDE SCREW-AND-YOKE TYPE VALVE

DETAILED EXPLANATION OF INVENTION

The present invention relates to an outside screw-and-yoke type valve, and in particular, relates to a valve which is not damaged or destroyed, when an operator accidently manipulates a handwheel of the valve by force in the case when the valve is in the state of being impossible to be operated.

Conventionally the gate valve and the globe valve are widely employed in this art. In the American Petroleum Institute (API) Standard 600 there is shown a steel gate valve, and also in the British Standard (BS) 1873 of 1975 there is introduced a steel globe valve, a globe stop valve and a check valve (flanged and butt-welding ends) for the petroleum, petrochemical and allied industries.

In these aforementioned outside screw-and-yoke type valves there are provided gate (in the case of the gate valve) and a disk (in the case of the valve) for performing opening and shutting movements of a stream path of the valve body. A stem having a screw which is mounted on the gate is supported with a yoke provided on the valve body or on the bonnet of the valve body.

In a hole bored on the upper portion of the yoke a stem nut is rotatably but immovably fitted in the axial direction, and the screw of the stem is in engagement with a stem nut.

Due to turning of the stem nut with the handwheel or the like, the stem begins to move upwards and downwards and according to the movements, the gate performs opening and shutting operations.

The construction of the globe valve closely resembles that of the gate valve, but differs from that of the latter in that in the construction of the globe valve a yoke bush is fitted in the hole bored on the upper pof the yoke bush engages with that of the stem, so that the stem performs up and down movements by turning the stem with the handwheel or the like, and according to the movements, the disk operates in opening and shutting movements. As mentioned above in the state of the gate valve or the globe valve being shut, a seat ring of the valve body is in close contact with the gate or the disk. In such a state as mentioned above, there are some cases in which the gate (or the disk in the case of the globe valve) can not be opened in spite of trying to move the stem as a result of the seat rings being secured to the gate (theparticles or the like included in the fluid to be channeled through the valve, when such particles or the like are caught between the seat rings and the gate (the disk), there occurs a case in which the valve only shut by force by turning the handwheel. In these cases when the valve is opened or shut by force, the portion at which the gate (or the disk) and the stem is connected with each other, that is, "the stem connection" is liable to be destroyed. In other cases the bonnet bolts which connect the bonnet to the valve body can become extended so as to cause the fluid to leak from gap between the valve body and the bonnet. Also the yoke can become extended and/or cut. These cases above mentioned are apt to cause serious disasters.

In view of the above disadvantages of the conventional valves, it is the primary object of the present invention to provide a valve in which afore-mentioned disadvantageous points are clearly improved.

It is the second object of the present invention to prevent the valve from suffering serious damage or being destroyed when the valve is operated in its inoperable state by force with the handwheel.

Further, it is the third object to surely inform the operator that the state of valve is being inoperable by causing limited destruction to those replaceable portions.

Those aforedescribed objects and other objects of the present invention are accomplished by an outside screw-and-yoke type valve comprising:
a body having a stream path and end ports;
a body head secured on the top of the body and having a nut member thrustly secured to the body head; and
a shutting member containing a gate or disk, seat rings for closing with the gate or the disk for closing the stream path in the body and a stem thrustly secured to the gate/disk and having a screw on its outside engaging the nut member in the body head, the rotation of the stem causing the gate/disk to open or close the stream path;
wherein the portion thrustly securing the nut member with the body head has a breakable structure by a weaker tension than the stem and the stem connection with the gate/disk.

Other objects and features of the present invention will be clearly understood from the following descriptions of the invention with reference to the accompanied drawings.

FIG. 1 is a sectional view of the gate valve according to the present invention;

FIG. 1-a is a fragmentary enlarged side view of the gate and the stem connection in the gate valve shown in FIG. 1.

Figure 9:
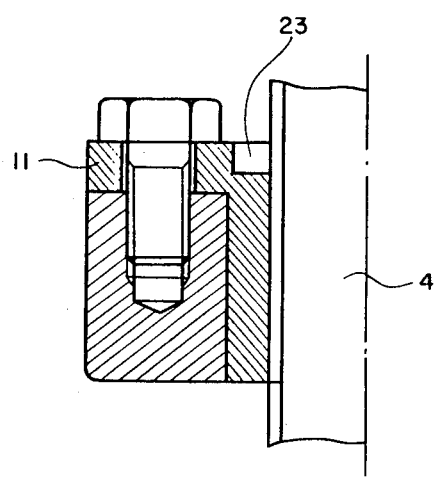

FIG. 9-a is a fragmentary enlarged side view of the gate and the stem connection in the globe valve shown in FIG. 9.

Figure 8:
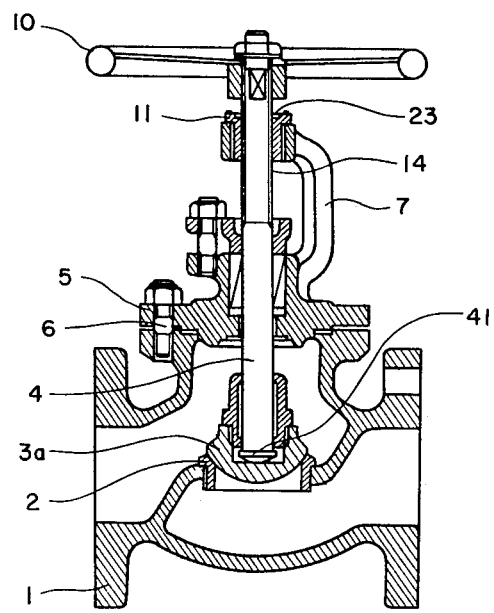
FIG. 8 is a sectional view of the globe valve according to the present invention.
Figure 10:
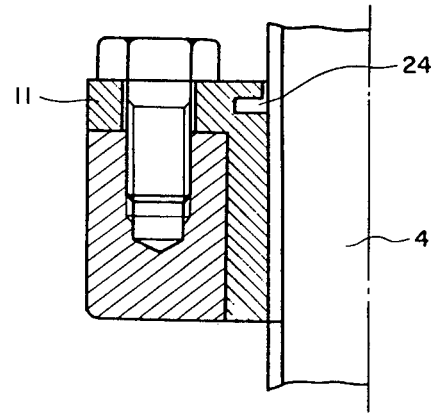
Figure 11:
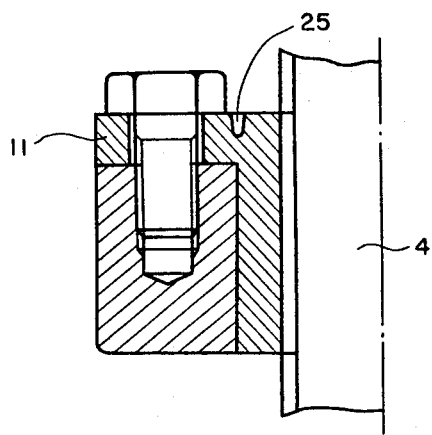
Figure 12:
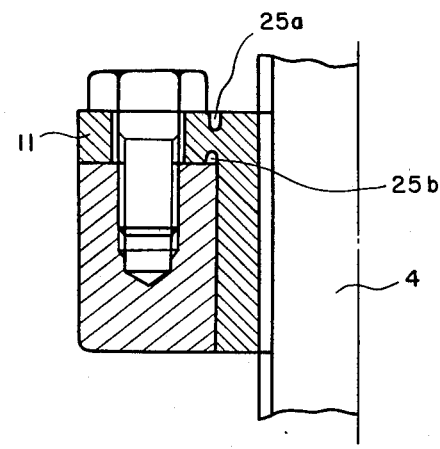

FIG. 9 is an enlarged scale view of the essential part of the globe valve made according to the present invention and shown in FIG. 8; and FIGS. 10 to 12 are enlarged scale views of the essential parts of other embodiments of the present invention.

Figure 1:
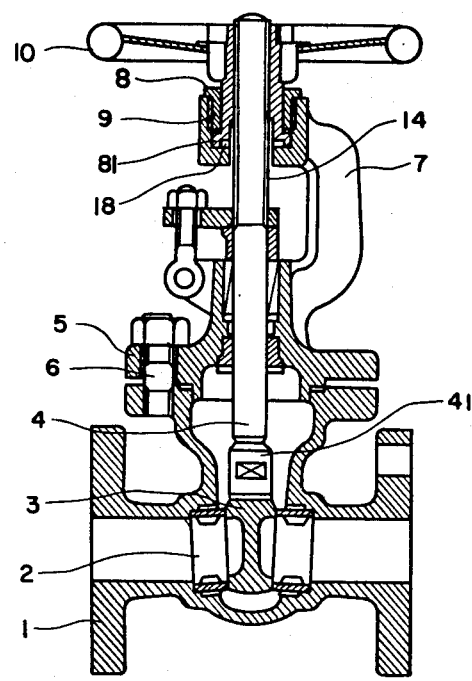
Figure 2:
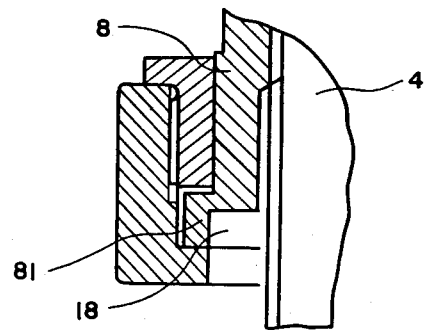
FIG. 2 is an enlarged scale view of the essential part of the embodiment of the gate valve made according to the invention and shown in FIG. 1.

The present invention will be described in detail with reference to the drawings. Now attention is first directed to FIGS. 1 and 2.

In this gate valve there is provided a stream path in a valve body (1), and end ports at both ends thereof. To the upper portion of the body (1) a bonnet (5) is secured by bonnet bolts (6), and on the upper portion of the bonnet (5) a yoke (7) which is made in a body with the bonnet (5). A stem nut (8) is maintained rotatably, but immovably in the axial direction, by a stem nut retaining nut (9).

On the upper portion of the stem nut (8) a handwheel (10) is provided, which is to be operated by an operator to turn the stem nut (8). There are maintained two seat rings (2) oppositely disposed in the body (1), between these seat rings the gate (3) is inserted from above to shut the stream path.

The upper portion of the stem (4) is threaded to provide a screw (14) and onto which the stem nut (8) is screwed. The lower end of the stem (4) is secured to the upper portion of the gate (3). The stem (4) is adapted not to rotate with respect to the bonnet (5) or the valve body (1). By turning the handwheel (10), the stem nut (8) is rotated so that the stem (4) and the gate (3) move upwards and downwards.

In the gate valve according to the present invention a radical projection of this stem nut (8), that is, to the side of the inside diameter of a collar portion (81) a notch (18) is cut. Due to this notch (18) a portion of the stem nut (8) at which the body (1) and the collar (81) are connected becomes thin.

In the case the gate (3) is immovably held between the seat rings (2), and when the operator wishes to operate the handwheel (10) for moving the gate (3) the valve made according to the present invention is constructed such that without damaging the stem (4) and the stem connection (41), only a replaceable thin portion of the stem nut (8) need be destroyed.

When the gate valve is closed by the handle, the stem nut 8 rises along the clearance between the stem nut 8 and the retaining nut 9, and the collar portion 81 engages the nut 9 so that an axially downward force acts on the collar portion 81. An axially upward force acts on the stem nut 8 as a result of the threaded engagement between the stem nut 8 and the stem 4. This is a force which axially pulls the stem nut 8. This force depends on the torque applied to the handwheel, and if it reaches a certain level, a fracture appears at right angles, or parallel to the root of the collar portion 81. If any attempt is made to open the valve by forcible handwheel operation, a compressive force acts axially on the stem nut 8 between the collar portion and the threaded portion. If this compressive force reaches a certain level, depending on the torque applied to the handwheel, a fracture appears at the root of the collar portion 81 parallel to its axis. Such fracture is easily detected, since the handwheel 10 descends into intimate contact with the retaining nut 9 after fracture. The same is true with the yoke bush of a globe valve made in accordance with the present invention, as will hereinafter be described.

In the following embodiment the stem of the gate valve of pressure classification 150 lb/inch$^2$ is made of stainless steel AISI 403 and the stem nut is manufactured with aluminum bronze ASTM B148. The tensile strength of AISI 403 is some 6.0 ton/cm$^2$, whereas the shearing strength of ASTM B148 is approximately 4.4 ton/cm$^2$. With respect to those valve sizes from 4" to 8", the gate valves according to the present invention were constructed as shown in the following table. In Table 1, D indicates an outside diameter, t indicates thickness of a neck portion, that is, the thickness of the portion of the stem nut at which the body and the collar portion are connected, and S indicates the sectional area of the root of the stem operating thread.

TABLE 1

| Valve Size (inch) | D (mm) | t (mm) | S (cm$^2$) |
|---|---|---|---|
| 4 | 40 | 3.5 | 3.97 |
| 6 | 45 | 4.5 | 5.10 |
| 8 | 54 | 4.0 | 5.93 |

The measurements shown in Table 2 were obtained with respect to each of the root of the stem operating thread, the stem connection, and the neck portion of the stem nut by measuring respective values of shearing load $F_1$, $F_2$ and $F_3$.

TABLE 2

| Valve Size (inch) | $F_1$ (tons) | $F_2$ (tons) | $F_3$ (tons) | f (tons) |
|---|---|---|---|---|
| 4 | 24.3 | 18.8 | 8.5 | 4.1 |
| 6 | 30.6 | 26.6 | 16.2 | 9.1 |
| 8 | 35.6 | 48.0 | 20.6 | 14.9 |

The values listed under the letter f in Table 2 are shown only for reference, and are calculated values of the shearing load of the bottom portion of the threaded stem (ACME-type screw, per API standard). As can be clearly understood, in the valve according to the present invention, value of the shearing load $F_3$ of the neck portion of the stem nut was found to be smaller than that of shearing load $F_1$ of the root of operating thread of screw (14) and also that of shearing load $F_2$ of the stem connection. Further, it was also seen that the value of shearing load $F_2$ is, as same those shown in standard, larger than that of $F_1$, and larger than the calculated value of shearing load of the bottom portion of the ACME-type stem screw.

In FIGS. 3 to 7 there are shown other embbodiments of the present invention. In the stem nut (8) in FIG. 3 there is cut a groove (19), and at the lower portion of the collar portion (81) there is a protrusion (82) projecting in the direction of the inside diameter. By means of this protrusion it is possible to minimize bending.

Figure 4:
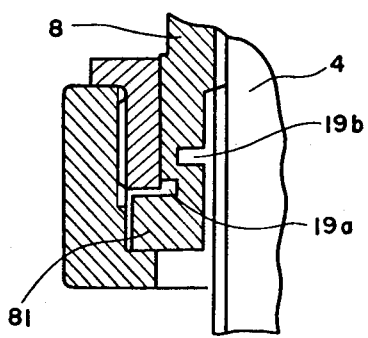

The stem nut (8) shown in FIG. 4 is provided with a neck portion by two grooves (19a) and (19b). These grooves (19a) and (19b) may be used as oil reservoirs.

Figure 3:
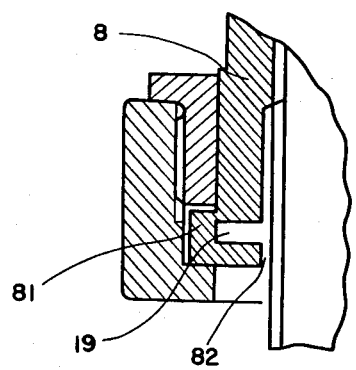
FIGS. 3 to 7 are enlarged scale views of the essential parts of other embodiments of the present invention.
Figure 5:
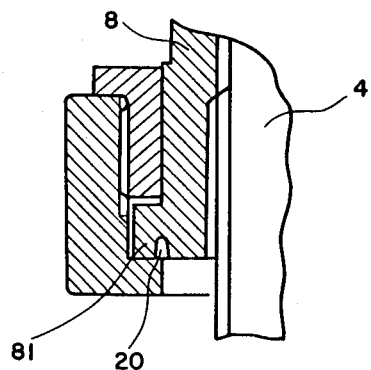

In the stem nut (8) shown in FIG. 5 there is provided a neck portion by a notch (20), which embodiment also has the advantages described in respect to the FIG. 3 embodiment.

Figure 6:
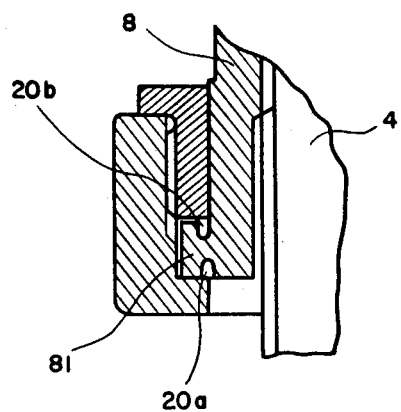

In the stem nut (8) in FIG. 6 there is also provided a neck portion by two notches (20a) and (20b). In this case the notch (20b) may be utilized as an oil reservoir.

Figure 7:
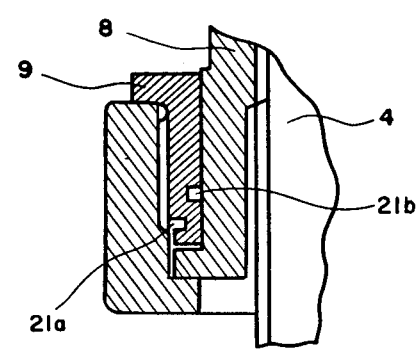

In the valve shown in FIG. 7 there are provided two grooves (21a) and (21b) cut in a stem nut retaining nut (9) in place of the stem nut (8), and a neck portion is thus formed on the retaining nut (9).

The shape and position of the groove are very important factors of the present invention. If they are designed appropriately, it is easily possible to set separate loads for stem nut fracture when the valve is opened, and when it is closed. The stem connection is of greater strength than the threaded bottom of the stem which is in turn of greater strength that the grooved stem nut. The grooved stem nut is of the least strength, and fracturable without resulting in any damage to the unreplaceable important parts of the valve, such as gate or stem. The resulting valve is inexpensive, and simple in construction, since it does not employ any separate fracturable part, such as a shear pin. These advantages are also attainable from a globe valve according to a different embodiment of this invention, as will hereinafter be described.

In FIG. 8 a globe valve to which the present invention is applied is shown.

The globe valve is constructed so that a threaded portion of the stem (4) is to engage with a threaded portion of a yoke bush (11) mounted on the upper portion of the yoke (7). At the upper portion of the stem (4), the handwheel (10) is provided and to the lower end thereof a disk (3a) is fitted. Accordingly, when the handwheel is turned, the stem (4) and the disk (3a) move upwards and downwards to open and shut the stream path.

As shown in FIGS. 8 and 9 a notch (23) is provided in the side of the inside diameter of a flange portion of the yoke bush (11). By means of this notch (23) the portion of the yoke bush (11) at which the body and the flange portion are connected becomes thin. The very portion above mentioned thin portion becomes a neck portion.

In case of the disk (3a) being in immovable state in the valve body, for example, by freezing phenomenon or the like, even if the operator inadvertently turns the handwheel (10) to move the disk (3a), it is advantageously constructed that the neck portion of the yoke bush (11) is to be destroyed without damaging the stem (4) and the stem connection (41). In yoke bush (11) shown in the embodiment of FIG. 10 a different type of groove (24) is provided.

In the yoke bush (11) shown in the embodiment of FIG. 11 there is provided a notch (25), and in the yoke bush (11) shown in the embodiment of FIG. 12 there are provided two notches (25a) and (25b).

The principle applied to the apparatus shown in FIGS. 10-12 is quite the same as that in FIG. 9.

Thus hindrances can be easily detected from the outside.

What is claimed is:

1. A screw-and-yoke type valve for use out of doors comprising:
    a body having a stream path and end ports and also having seat ring means encircling said stream path;
    a body head secured on the top of the body and having nut means, and means for thrustly securing said nut means to the body head; and
    a shutting member containing a gate or disk for sealing cooperation with said seat ring means for closing the stream path in the body, a stem, a stem connection for thrustly securing said stem to the gate/disk, said stem having a threaded outside operating portion engaging the nut means in the body head, the axial displacement of said stem relative to said nut means of the stem causing the gate/disk to open or close the stream path, wherein said nut means includes means for limiting the axial forces transmittable to said shutting member through said stem, said force limiting means including a nut member having an integral weakened portion for selective breakage at axially directed forces less than the axial breakage strengths of either said stem or said stem connection, and
    said valve further including detection means for permitting visual ascertainment of breakage of said weakened nut member portion,
    wherein the body head has a yoke and wherein the valve includes a retaining nut fixed in a hole of the yoke, the retaining nut and the side wall of the hole constituting a ring groove in the wall, and wherein the valve further includes a stem nut threadably connected to said stem, and the stem nut has a radially protruding collar which engages the ring groove, and wherein the nut member is the stem nut and wherein the weakened portion is the portion of the stem nut connecting the radially protruding collar.

2. A screw-and-yoke type valve for use out-of-doors comprising:
    a body having a stream path and end ports and also having seat ring means encircling said stream path;
    a body head secured on the top of the body and having nut means, and means for thrustly securing said nut means to the body head; and
    a shutting member containing a gate or disk for sealing cooperation with said seat ring means for closing the stream path in the body, a stem, a stem connection for thrustly securing said stem to the gate/disk, said stem having a threaded outside operating portion engaging the nut means in the body head, the axial displacement of said stem relative to said nut means of the stem causing the gate/disk to open or close the stream path, wherein said nut means includes means for limiting the axial forces transmittable to said shutting member through said stem, said force limiting means including a nut member having an integral weakened portion for selective breakage at axially directed forces less than the axial breakage strengths of either said stem or said stem connection; and
    said valve further including detection means for permitting visual ascertainment of breakage of said weakened nut member portion,
    wherein the body head has a yoke and wherein the valve includes a retaining nut fixed in a hole of the yoke, the retaining nut and the side wall of the hole constituting a ring groove in the wall, and wherein the valve further includes a stem nut threadedly connected to said stem, and the stem nut has a radially protruding collar which engages the ring groove, and
    wherein the nut member is the retaining nut and wherein the weakened portion is positioned between the retaining nut portions which engage the yoke and the stem nut, respectively.

3. A screw-and-yoke type valve for use out-of-doors comprising:
    a body having a stream path and end ports and also having a seat ring means encircling said stream path;
    a body head secured on the top of the body and having nut means, and means for thrustly securing said nut means to the body head; and
    a shutting member containing a gate or disk for sealing cooperation with said seat ring means for closing the stream path in the body, a stem, a stem connection for thrustly securing said stem to the gate/disk, said stem having a threaded outside operating portion engaging the nut means in the body head, the axial displacement of said stem relative to said nut means of the stem causing the gate/disk to open or close the stream path, wherein said nut means includes means for limiting the axial forces transmittable to said shutting member through said stem, said force limiting means including a nut member having an integral weakened portion for selective breakage at axially directed forces less than the axial breakage strengths of either said stem or said stem connection, and
    said valve further including detection means for permitting visual ascertainment of breakage of said weakened nut member portion, and
    wherein the body head has a yoke and the nut member is a yoke bush having a flange connected to the yoke, wherein the weakened portion is at the portion connecting the yoke bush with the flange.

4. The valve as set forth in claim 1, 2 or 3, wherein the strength of the stem at the root of its operating thread is at most equal the strength of the stem connection and the strength of the stem is at least equal the strength of the nut member weakened portion.

5. The valve as set forth in claim 1, 2 or 3, wherein the stem nut, retaining nut or yoke bush is formed with at least one groove to provide the respective weakened portion.

6. The valve as set forth in claim 5, wherein the groove also serves as an oil reservoir.

7. The valve as set forth in claim 5, wherein the groove is a radially directed annular groove.

8. The valve as set forth in claim 1, wherein the stem nut is formed from aluminum bronze.

9. The valve as set forth in claim 1, 2 or 3, wherein said breakage detection means includes sufficient axial clearances between the non-weakened portion of said nut member and said valve body to allow visual detection of relative movement therebetween following breakage of the weakened portion.

* * * * *